United States Patent
Kuroda

(10) Patent No.: US 9,319,921 B2
(45) Date of Patent: Apr. 19, 2016

(54) LOAD DISTRIBUTION IN AN EPC NETWORK OF A MOBILE COMMUNICATION SYSTEM

(75) Inventor: Satoshi Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 232 days.

(21) Appl. No.: 14/115,696

(22) PCT Filed: May 22, 2012

(86) PCT No.: PCT/JP2012/003320
§ 371 (c)(1),
(2), (4) Date: Nov. 5, 2013

(87) PCT Pub. No.: WO2012/172729
PCT Pub. Date: Dec. 20, 2012

(65) Prior Publication Data
US 2014/0064099 A1 Mar. 6, 2014

(30) Foreign Application Priority Data
Jun. 14, 2011 (JP) ................... 2011-132507

(51) Int. Cl.
*H04W 28/02* (2009.01)
*H04L 29/12* (2006.01)
(Continued)

(52) U.S. Cl.
CPC ....... *H04W 28/0205* (2013.01); *H04L 61/1511* (2013.01); *H04L 61/2076* (2013.01); *H04L 67/1002* (2013.01); *H04L 67/1008* (2013.01); *H04W 28/08* (2013.01)

(58) Field of Classification Search
CPC ............................................. H04W 28/0205
USPC ......................................................... 370/236
See application file for complete search history.

(56) References Cited

U.S. PATENT DOCUMENTS

| 6,950,390 B2 | 9/2005 | Tomoike |
| 7,782,818 B2 | 8/2010 | Hurtta et al. |

(Continued)

FOREIGN PATENT DOCUMENTS

| CN | 101616152 | 12/2009 |
| JP | 2002-007238 | 1/2002 |

(Continued)

OTHER PUBLICATIONS

3rd generation partinership project: Alcatel-Lucent Et al, "Dynamic DNS for loading Balancing-TR changes" published Apr. 11-15, 2011, 4 pages.*
xtended European search report, dated Mar. 31, 2015, in corresponding European Patent Application No. 12800404.1.
International Search Report, PCT/JP2012/003320, Jul. 3, 2012.
(Continued)

*Primary Examiner* — Ian N Moore
*Assistant Examiner* — Mewale Ambaye
(74) *Attorney, Agent, or Firm* — Young & Thompson

(57) ABSTRACT

A configuration is such that among EPC nodes such as an S-GW 104 and a P-GW 105, which form an EPC network, a DNS server 101 selects the EPC node to use based on a selection priority in a DNS resource record registered to the DNS server 101 to thereby distribute loads of the EPC nodes. Further, each of the EPC nodes has a function to transmit, to the DNS server 101, an update request for the DNS resource record in order to lower the selection priority of the DNS resource record relating to the EPC node when the EPC node detects that resource usage of the own EPC node is approaching to an overloaded state. Meanwhile, in response to the update request, the DNS server 101 dynamically updates the DNS resource record, when the DNS server 101 receives the update request from the EPC node.

9 Claims, 4 Drawing Sheets

(51) Int. Cl.
*H04L 29/08* (2006.01)
*H04W 28/08* (2009.01)

(56) References Cited

U.S. PATENT DOCUMENTS

| | | | |
|---|---|---|---|
| 8,441,995 | B2 | 5/2013 | Xi et al. |
| 8,495,214 | B2 | 7/2013 | Xu et al. |
| 2001/0055285 | A1 | 12/2001 | Tomoike |
| 2010/0202351 | A1 | 8/2010 | Xi et al. |
| 2010/0299419 | A1 | 11/2010 | Ramankutty et al. |

FOREIGN PATENT DOCUMENTS

| | | | |
|---|---|---|---|
| JP | 2003534714 | | 11/2003 |
| JP | 2010-539758 | | 12/2010 |
| WO | 2010132884 | | 11/2010 |
| WO | WO2010/132884 | * | 11/2010 |

OTHER PUBLICATIONS

Nokia Siemens Networks, Discussion paper on Optimized load balancing within EPC, C4-093044, 3GPP, Oct. 15, 2009, paragraph 1, 2.
Orange, China Mobile, LDF architecture update, W2-110825, 3GPP, Feb. 25, 2011, paragraph 6.1.1.3.2.
Samsung, On the DNS Function used for Server 'Selection, S2-082664, 3GPP, Apr. 11, 2008, figure 4.
Japanese Office Action, dated Dec. 2, 2014, in corresponding Japanese Patent Application No. 2013-520413, with partial English translation.
3rd Generation Partnership Project; Technical Specification Group Services and System Aspects; Feasibility Study on IMS Evolution; (Release 9), S2-103306, France, 3GPP, Aug. 23, 2010.
3rd Generation Partnership Project; Alcatel, CSCF discovery, S2-001400, France, 3GPP, Sep. 1, 2000.
3rd Generation Partnership Project; Alcatel-Lucent, Dynamic DNS for Load Balancing—TR changes, S2-111714, France, 3GPP, Apr. 6, 2011.

* cited by examiner

LOAD DISTRIBUTION IN AN EPC NETWORK OF A MOBILE COMMUNICATION SYSTEM

The present application claims priority rights of and is based on Japanese Patent Application No. 2011-132507 filed on Jun. 14, 2011 in the Japanese Patent Office, the entire contents of which are hereby incorporated by reference.

TECHNICAL FIELD

The present invention relates to a mobile communication system, a control method thereof, and a non-transitory computer readable medium storing a control program, and in particular, to a mobile communication system that efficiently distributes loads in an EPC (Evolved Packet Core) network which forms a core of an LTE (Long Term Evolution) network, a control method thereof, and a non-transitory computer readable medium storing a control program.

BACKGROUND ART

Mobile communication systems in recent years have developed rapidly. 3GPP (3rd Generation Partnership Project) is proceeding with standardization of LTE (Long Term Evolution) which realizes mobility complying with all types of traffic using an IP (Internet Protocol) protocol as a next mobile communication system. An LTE network is composed of eUTRAN (Evolved Universal Terrestrial Radio Network), which is a wireless network, and EPC (Evolved Packet Core), which forms a core network. Explained below is an allocation method of resources and load distribution method in an EPC network of a related art that have been also examined in, for example, "METHOD, SYSTEM AND DEVICE FOR SUPPORTING ADDRESSING THE USER STATIC IP ADDRESS IN LONG TERM EVOLUTION SYSTEM" disclosed in Published Japanese Translation of PCT International Publication for Patent Application, No. 2010-539758.

An MME (Mobility Management Entity) has a function to appropriately distribute loads and select an EPC node (MME/S-GW/P-GW/SGSN) taking into account a priority set to each of an NAPTR (Naming Authority Pointer) record/an SRV (Service) record that are registered to a DNS (Domain Name Server) server as DNS resource records and shown in Tables 1 and 2.

TABLE 1

Format: NAPTR record

| Order | Priority in a list of NAPTR RR returned at a time (smaller values have higher priority) 16 bit unsigned integer |
| --- | --- |
| Preference | Relative priority in records with the same value of Order field (smaller values have higher priority) 16 bit unsigned integer |
| Flag | Type of value in Replacement field Replacement "s" . . . Value in Replacement field is a key for SRV RR search "a" . . . Value in Replacement field is a key for A/AAAA RR search "" . . . Value in Replacement field is a key for NAPTR RR search |
| Service | Service name, protocol name [Service name]:[Protocol name]:[Protocol name] . . . (:[Protocol name]) repeats 0 or more times |
| Regexp | Output result Replacement rule using regular expression |
| Replacement | Output result FQDN(Name of SRV RR & A/AAAA RR) |

TABLE 2

Format: SRV record

| Priority | Priority in a list of SRV RR returned at a time (smaller values have higher priority) 16 bit unsigned integer |
| --- | --- |
| Weight | Relative priority in records with the same value of Priority field 16 bit unsigned integer |
| Port | Connection destination port number 16 bit unsigned integer (0 to 65535) |
| Target | Connection destination Registered to A/AAAA RR FQDN(Name of A/AAAA RR) |

A flow of selecting an S-GW (Serving Gateway) to be connected by an MME (Mobility Management Entity) is explained using an explanatory diagram of FIG. 3. However, this not only applies to an S-GW but also to the case of selecting other types of EPC nodes that are an MME, an SGSN (Serving GPRS (General Packet Ratio Service) Support Node), and a P-GW (Packet data network Gateway). FIG. 3 is an explanatory diagram explaining a flow of processing for selecting an S-GW (Serving Gateway) by an MME (Mobility Management Entity) in an EPC (Evolved Packet Core) network of a related art. FIG. 3 shows the case in which there are three gateways that are an S-GW1 31, an S-GW2 32, and an S-GW3 33 as S-GWs to be selected.

In the explanatory diagram of FIG. 3, firstly an MME 35 queries a DNS server 34 for addresses of connectable S-GWs (Step S301). With the query, the MME 35 receives, from the DNS server 34, a plurality of NAPTR records shown in Table 1 indicating connectable S-GWs (Step S302). The MME 34, which received the plurality of NAPTR records, selects a particular NAPTR record with the highest priority according to priorities set to each of an Order field and a Preference field of the plurality of received NAPTR records.

Next, the MME 35 refers to a Flag field of the selected NAPTR record, and when Flag="", it indicates that an FQDN (Fully Qualified Domain Name) set to a Replacement field as an output result is set as a key for NAPTR RR (Resource Record) search. Thus, the MME 35 repeats an operation of querying the DNS server 34 again for an NAPTR record corresponding to the FQDN and an operation of receiving NAPTR records shown in Table 1 from the DNS server 34.

Moreover, when the Flag field of the selected NAPTR record upon reference by the MME 35 has setting of Flag="a", it indicates that an FQDN (Fully Qualified Domain Name) set to the Replacement field as an output result is a fully qualified domain name composed of an A/AAAA RR (an IPv4 address/an IPv6 address Resource Record) and the FQDN indicates an address of an S-GW to be selected. Thus, the MME 35 determines the S-GW as an S-GW to be selected.

Meanwhile, when the Flag field of the selected NAPTR record upon reference by the MME 35 has setting of Flag="s", it indicates that an FQDN (Fully Qualified Domain Name) set to the Replacement field as an output result is set as a key for SRV RR (Service Resource Record) search. Thus, the MME 35 queries the DNS server 34 for an SRV record corresponding to the FQDN and receives SRV records shown in Table 2 from the DNS server 34.

The MME 35, which received the SRV records from the DNS server 34, selects an SRV RR (Resource Record) with the highest priority according to priorities set to each of a Priority field and a Weight field of the received SRV records and retrieves an FQDN that is set to a Target field as a connection destination. When the FQDN indicates a fully qualified domain name of an A/AAAA RR (an IPv4 address/an IPv6 address resource record), the FQDN indicates an address of an S-GW to be selected. Thus, the MME 35 determines the S-GW as an S-GW to be selected.

Among the three gateways, which are the S-GW1 31, the S-GW2 32, and the S-GW3 33, the MME 35 transmits a connection command to a particular S-GW that is determined as the one to be selected according to the priority of the selected NAPTR record or the selected SRV record, for example to the S-GW2 32 (Step S303) to thereby connect to the corresponding S-GW, for example the S-GW2 32.

FIG. 4 is a sequence diagram showing a sequence of a control signal transmitted and received between the MME 35 and the DNS server 34 in the flow of processing in FIG. 3. Explained below is a flow of a control signal transmitted and received between the MME 35 and the DNS server 34 when the MME 35 selects an S-GW with reference to the sequence diagram of FIG. 4.

In the sequence diagram of FIG. 4, firstly the MME 35 transmits an NAPTR RR (an NAPTR resource record) query to the DNS server 34 and queries for addresses of connectable S-GWs (Sequence S401). The DNS server 34, which has received the NAPTR RR query from the MME 35, extracts a plurality of NAPTR RRs indicating connectable S-GWs and returns the extracted NAPTR RRs to the querying MME 35 as DNS responses to the NAPTR RR query (Sequence S402).

The MME 35, which received the DNS responses from the DNS server 34, selects one NAPTR RR according to a priority from an NAPTR RR list that is composed of a plurality of the received DNS responses. When the Flag field included in the NAPTR RR has setting of Flag="s", the MME 35 retrieves an FQDN, in the Replacement field, that indicates a domain name of an SRV RR (Sequence S403). After that, the MME 35 transmits an SRV RR (SRV resource record) query to the DNS server 34 and queries for the SRV record corresponding to the FQDN (Sequence S404).

The DNS server 34, which received the SRV RR query from the MME 35, appropriately extracts SRV RRs corresponding to the specified FQDN and returns the extracted SRV RRs to the querying MME 35 as DNS responses to the SRV RR query (Sequence S405).

The MME 35, which received the DNS responses from the DNS server 34, selects one SVR RR according to priorities from an SRV RR list of the received DNS responses (Sequence S406), transmits an A/AAAA RR query to the DNS server 34 when an FQDN (a Name of the A/AAAA RR) is set to the Target field as a domain name of the SVR RR, and queries for the A/AAAA RR (IPv4 address/IPv6 address resource record) of the SVR RR (Sequence S407).

The DNS server 34, which received the A/AAAA RR query from MME 35, extracts the fully qualified domain name A/AAAA RR corresponding to the specified SVR RR and returns the extracted A/AAAA RR to the querying MME 35 as a DNS response to the A/AAAA RR query (Sequence S408).

CITATION LIST

Patent Literature

Patent Literature 1: Published Japanese Translation of PCT International Publication for Patent Application, No. 2010-539758 (pp. 9-11)

SUMMARY OF INVENTION

Technical Problem

However, in the above-mentioned method of a related art, the DNS server registers setting of the DNS resource records located on the DSN server as fixed values at initial registration in order to respond to a query for a domain name and selects an EPC node (MME/S-GW/P-GW/SGSN) according to the priorities of the DNS source records that are set at initial registration to the DNS server.

Therefore, even when loads are imbalanced in an EPC network and there is an overloaded EPC node, it is not possible to make a selection in consideration of load balance in the EPC network and a selection of an EPC node (MME/S-GW/P-GW/SGSN) is made according to the priorities of the DNS resource records at the time of initial registration to the DNS server. Therefore, there is a possibility that the overloaded EPC node is selected, thereby further increasing the load of the EPC node and thus generating call loss.

Object of the Present Invention

The present invention is made in view of such circumstances, and an object of the present invention is to provide a mobile communication system that selects an optimal EPC node in consideration of load imbalance in an EPC network for resolving the load imbalance, a control method thereof, and a non-transitory computer readable medium storing a control program.

Solution to Problem

In order to solve the above-mentioned issue, a mobile communication system according to the present invention, a control method thereof, and a non-transitory computer readable medium storing a program thereof have the following main characteristic configurations.

(1) A mobile communication system according to the present invention distributes loads of each of EPC nodes by selecting an EPC node to use, by a DNS server, among the EPC nodes forming an EPC (Evolved Packet Core) network, which forms a core of an LTE (Long Term Evolution) network for mobile communication, based on a selection priority in a DNS resource record registered to the DNS server. Each of the EPC nodes includes a DDNS (Dynamic DNS) client function that transmits an update request for the DNS resource record to the DNS server in order to lower the selection priority of the DNS resource record relating to the EPC node when the EPC node detects that resource usage of the own EPC node exceeds an overloaded threshold previously specified to detect that the resource usage of the own EPC node is approaching to an overloaded state, and the DNS server includes a DDNS server function that dynamically updates, in response to the update request, the DNS resource record when the DNS server receives the update request for the DNS resource record from the EPC node.

(2) A control method of a mobile communication system according to the present invention is a control method of a mobile communication system that distributes loads of each of EPC nodes by selecting, using a DNS server, an EPC node to use, among the EPC nodes forming an EPC (Evolved Packet Core) network, which forms a core of an LTE (Long Term Evolution) network for mobile communication, based on a selection priority in a DNS resource record registered to the DNS server. Each of the EPC nodes includes a DDNS (Dynamic DNS) client function that transmits an update request for the DNS resource record to the DNS server in order to lower the selection priority of the DNS resource record relating to the EPC node when the EPC node detects that resource usage of the own EPC node exceeds an overloaded threshold previously specified to detect that the resource usage of the own EPC node is approaching to an overloaded state, and the DNS server includes a DDNS server function that dynamically updates, in response to the update request, the DNS resource record when the DNS server receives the update request for the DNS resource record from the EPC node.

(3) A non-transitory computer readable medium storing a control program for a mobile communication system according to the present invention can execute, by a computer, the control method of the mobile communication system at least according to (2).

Advantageous Effects of Invention

According to the mobile communication system, the control method thereof, and the non-transitory computer readable medium storing the program according to the present invention, following exemplary advantages can be achieved.

A first exemplary advantage is that when an EPC node detects that the own EPC node is approaching to an overloaded state, by autonomously changing a selection priority of a DNS source record (e.g. NAPTR record and SRV record) that is related to the own EPC node and registered to the DNS server, it is possible to set the EPC node approaching to the overloaded state to a difficult state for selection and allow other EPC nodes with available resource to be preferentially selected, thereby equally maintaining loads in the whole EPC network.

A second exemplary advantage is that after the selection priority is changed, the EPC node, which is completely out of the overloaded state and have available resource, autonomously returns, to the original selection priority, the selection priority of the DNS resource record that is related to the own EPC node and registered to the DNS server. Thus it is possible to return to the state allowing for normal selection and maintain loads in the whole EPC network equal.

DESCRIPTION OF EMBODIMENTS

Figure 1:
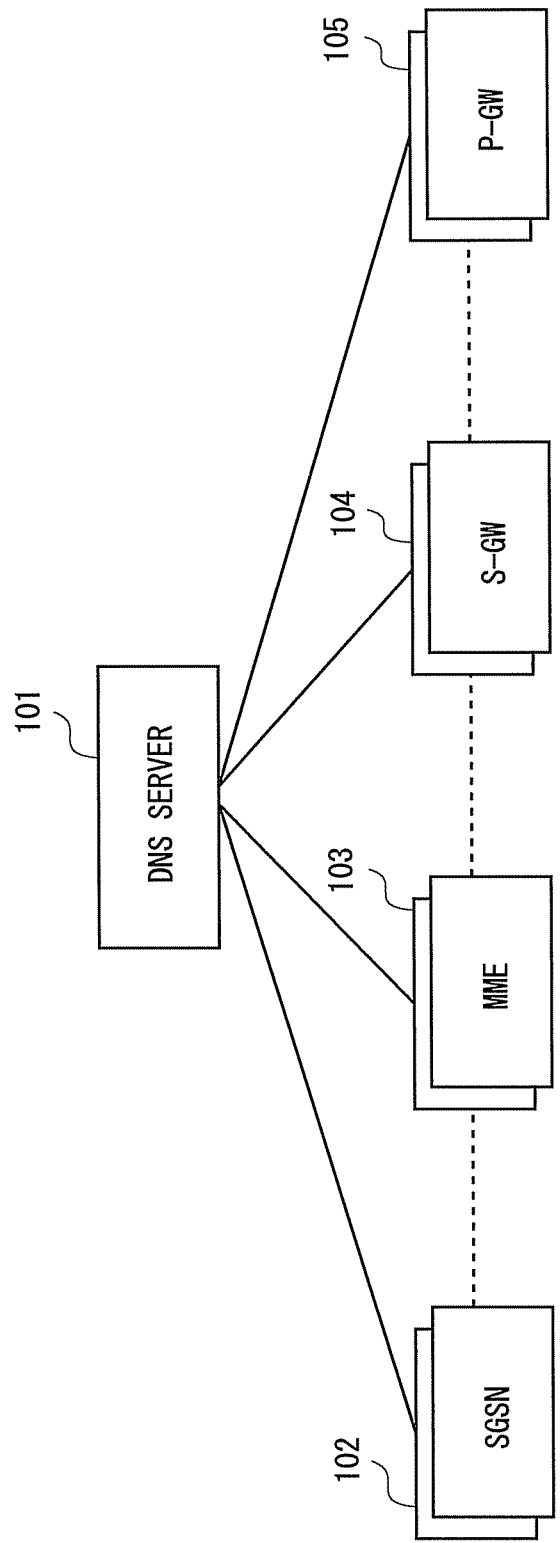
FIG. 1 is a system configuration diagram showing an example of a system configuration of a mobile communication system according to the present invention.

Explained below is a preferred exemplary embodiment of a mobile communication system, a control method of the mobile communication system, and a non-transitory computer readable medium storing a control program for the mobile communication system according to the present invention with reference to the attached drawings. Note that in the following explanation, the mobile communication system and the control method of the mobile communication system according to the present invention are explained. However, the control method of the mobile communication system may be executed as a control program for the mobile communication system executable by a computer or the control program for the mobile communication system may be recorded on a recording medium that is computer readable.

Features of the Present Invention

Prior to explanation of exemplary embodiment according to the present invention, an outline of features of the present invention is explained first. A main feature of the present invention is, in an EPC (Evolved Packet Core) network specified by 3GPP (3rd Generation Partnership Project), selecting an optimal EPC node according to load states of nodes forming the EPC network, i.e., EPC nodes (MME/S-GW/P-GW/SGSN) and enabling elimination of load imbalance of the EPC nodes.

More specifically, a DNS server includes a DDNS (Dynamic DNS) server function capable of dynamically updating DNS resource records, and further, a supplementary NAPTR record is newly added in which the supplementary NAPTR record enables an NAPTR or an SRV record, which is registered to the DNS server as a DNS resource record of the own EPC node, to be identified from an EPC node name (i.e., an EPC node name associated with an IP address of the EPC node). This therefore enables identification of a DNS resource record of an EPC node in response to an update request from the EPC node that has fallen into an overloaded state and enables update of a selection priority of the EPC node to be lower, thereby encouraging selection of other EPC nodes.

The newly added supplementary NAPTR record here has the same format as a normal NAPTR record. The supplementary NAPTR record is a record defined with Flag="p", Services="NAPTR" or "SRV", and Regexp="a domain name of an NAPTR record or an SRV record" and enables identification of the NAPTR record or the SRV record from an EPC node name. That is, by the supplementary NAPTR record, it is possible to identify an NAPTR record or an SRV record relating to selection of the own EPC node.

By the DDNS server function included in the DNS server, it is possible to dynamically change priorities of registered DNS resource records. Further, as the overloaded EPC node autonomously issues an update request for a DNS resource record that is related to the own EPC node in the DNS server, it is possible to update the DNS resource record and lower the selection priority of the own EPC node to thereby dynamically and equally distribute loads in an EPC network.

Configuration Example of an Exemplary Embodiment

Next, an example of a system configuration of the mobile communication system according to the present invention is explained using FIG. 1. FIG. 1 is a system configuration diagram showing an example of a system configuration of the mobile communication system according to the present invention.

In the system configuration of FIG. 1, one to a plurality of each of EPC nodes such as an SGSN 102, an MME 103, an S-GW 104, and a P-GW 105, which form an EPC network, are disposed according to communication loads requested for the respective EPC nodes and configured such that the EPC node selected by the DNS server 101 is used as appropriate to thereby distribute the loads.

In addition to functions that are required in an EPC network as a normal DNS server, the DNS server 101 further includes a DDNS (Dynamic DNS) server function specified in RFC (Request for Comments) 2136, i.e., a dynamical DNS resource record (DNS RR) update function (Dynamic Updates in the Domain Name System). Thus, in response to an update request for a DNS resource record from the mutually connected EPC nodes such as the SGSN 102, the MME 103, the S-GW 104, and the P-GW 105, the DNS resource record registered to the DNS server 101 can be dynamically updated.

Moreover, as a DNS resource record registered to the DNS server 101, in addition to an NAPTR record, an SRV record, and an A/AAAA record that are necessary for an operation as an EPC network as the ones shown in Tables 1 and 2, following records are registered.
(1) A PTR record necessary for obtaining an EPC node name from an IP address and
(2) A supplementary NAPTR record necessary for obtaining a domain name of an SRV record and an NAPTR record from an EPC node name.

Note that the above-mentioned supplementary NAPTR record is registered to the DNS server 101 as an NAPTR record that satisfies the following definitions.
(a) Domain name="a domain name set to an A/AAAA record"
(b) Flag="p"
(c) Services="NAPTR" or "SRV"
(d) Regexp="a domain name of an NAPTR record or an SRV record targeted for an A/AAAA record indicated by the domain name of the NAPTR record"

That is, as an NAPTR record to be registered to the DNS server 101, definitions of Flag="p", Services="NAPTR" or "SRV", and Regexp="a domain name of an NAPTR record or an SRV record" are newly added. By the addition of the NAPTR record in this way, each of the EPC nodes such as the SGSN 102, the MME 103, the S-GW 104, and the P-GW 105 is capable of identifying, as a factor leading to selection of the own EPC node, a DNS resource record registered to the DNS server 101, i.e., the NAPTR record or the SRV record, from an IP address of the own EPC node.

Moreover, each of the EPC nodes such as the SGSN 102, the MME 103, the S-GW 104, and the P-GW 105 that are mutually connected to the DNS server 101 includes a DDNS (Dynamic DNS) client function corresponding to a DDNS server function of the DNS server 101 in addition to a normal DNS client function required in an EPC network. This enables the EPC nodes to transmit, to the DNS server 101 as appropriate, an update request for the NAPTR record and the SRV record relating to the own EPC node according to a current load state.

When a load of an EPC node has fallen into the overloaded state, the EPC node transmits, to the DNS server 101, an update request for a DNS resource record to lower a selection priority of the DNS resource record that is identified as the DNS resource record relating to the own EPC node. Then, the overloaded EPC node is set to a difficult state for selection, thereby encouraging other non-overloaded EPC node to be selected and autonomously enabling efficient load distribution in an EPC network.

Note that other configuration as the EPC network is same as a technique of a related art. Therefore, other configuration than those explained above is well known by a person skilled in the art and not directly related to the present invention, thus the detailed explanation of the configuration shall not be provided here.

Explanation of Operation of Exemplary Embodiment

Figure 2:
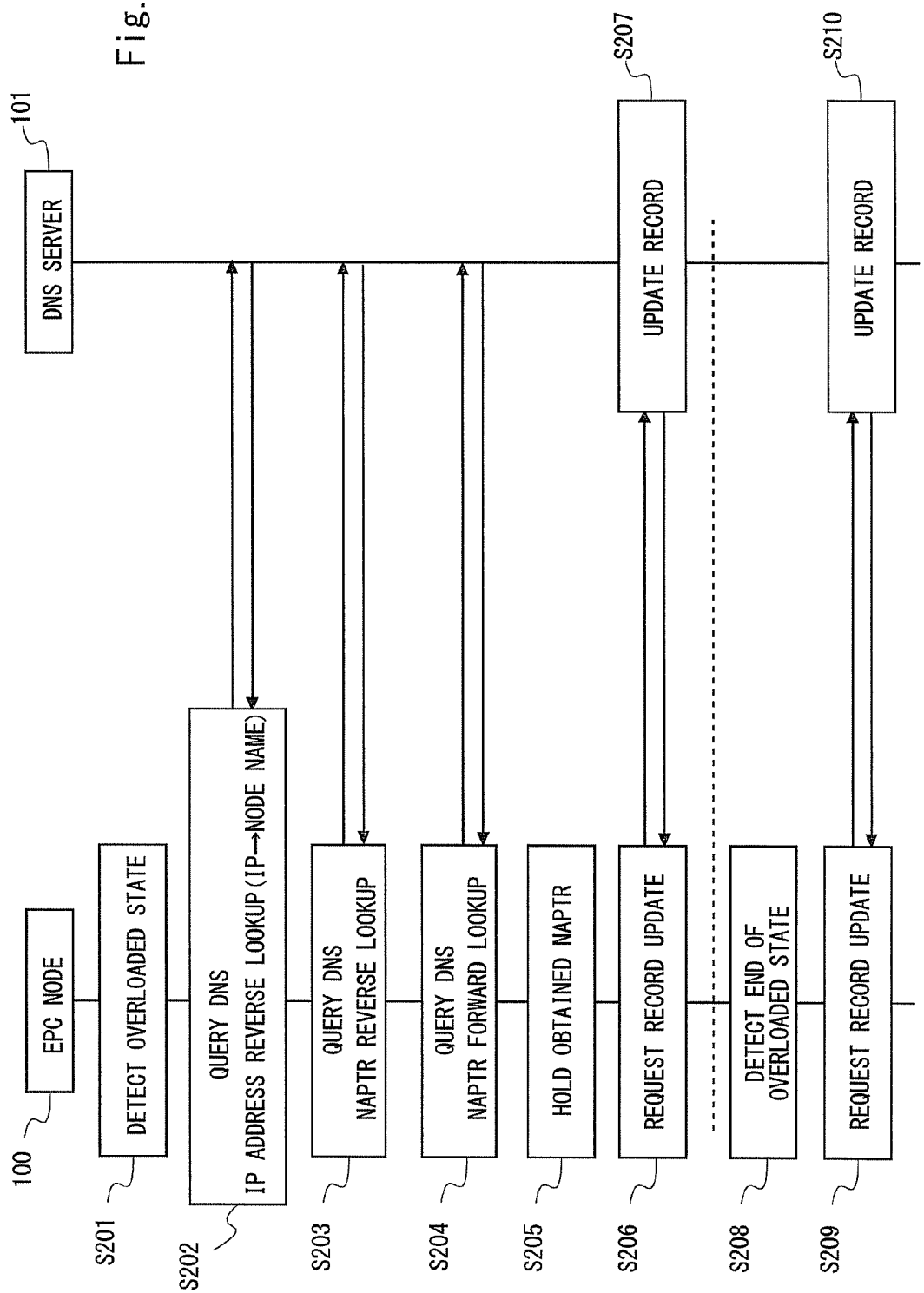
FIG. 2 is a sequence diagram for explaining an example of an operation of the mobile communication system of FIG. 1.
Figure 3:
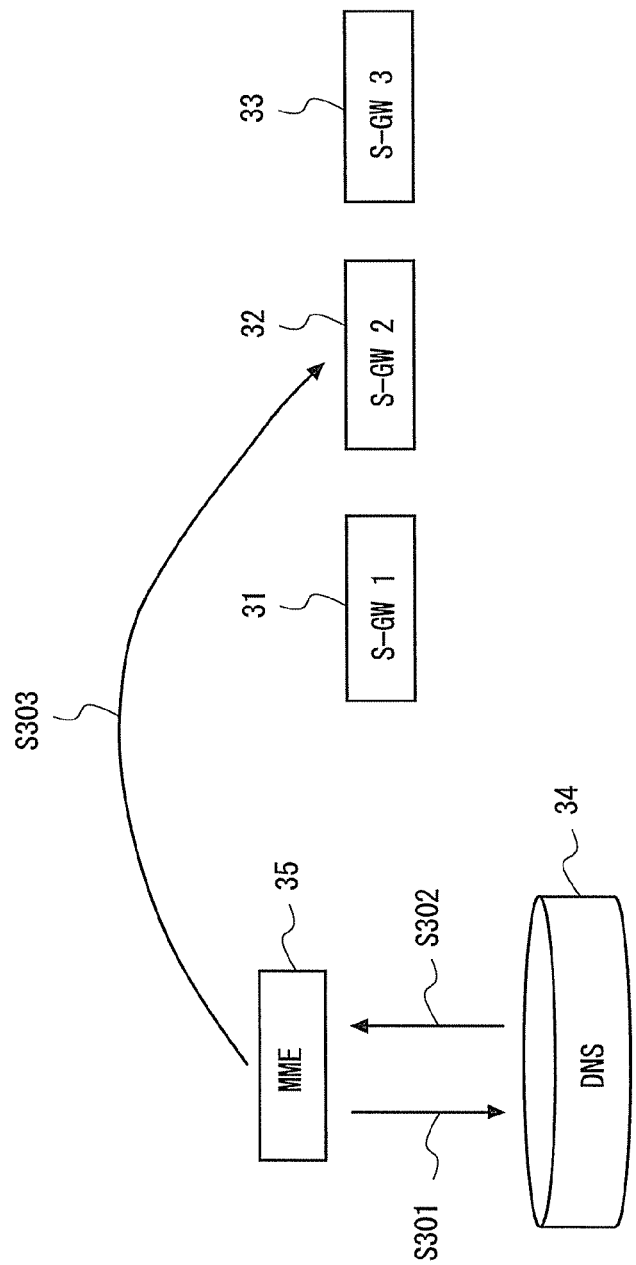
FIG. 3 is an explanatory diagram for explaining a process flow when an MME (Mobility Management Entity) selects an S-GW (Serving Gateway) in an EPC (Evolved Packet Core) network of a related art.
Figure 4:
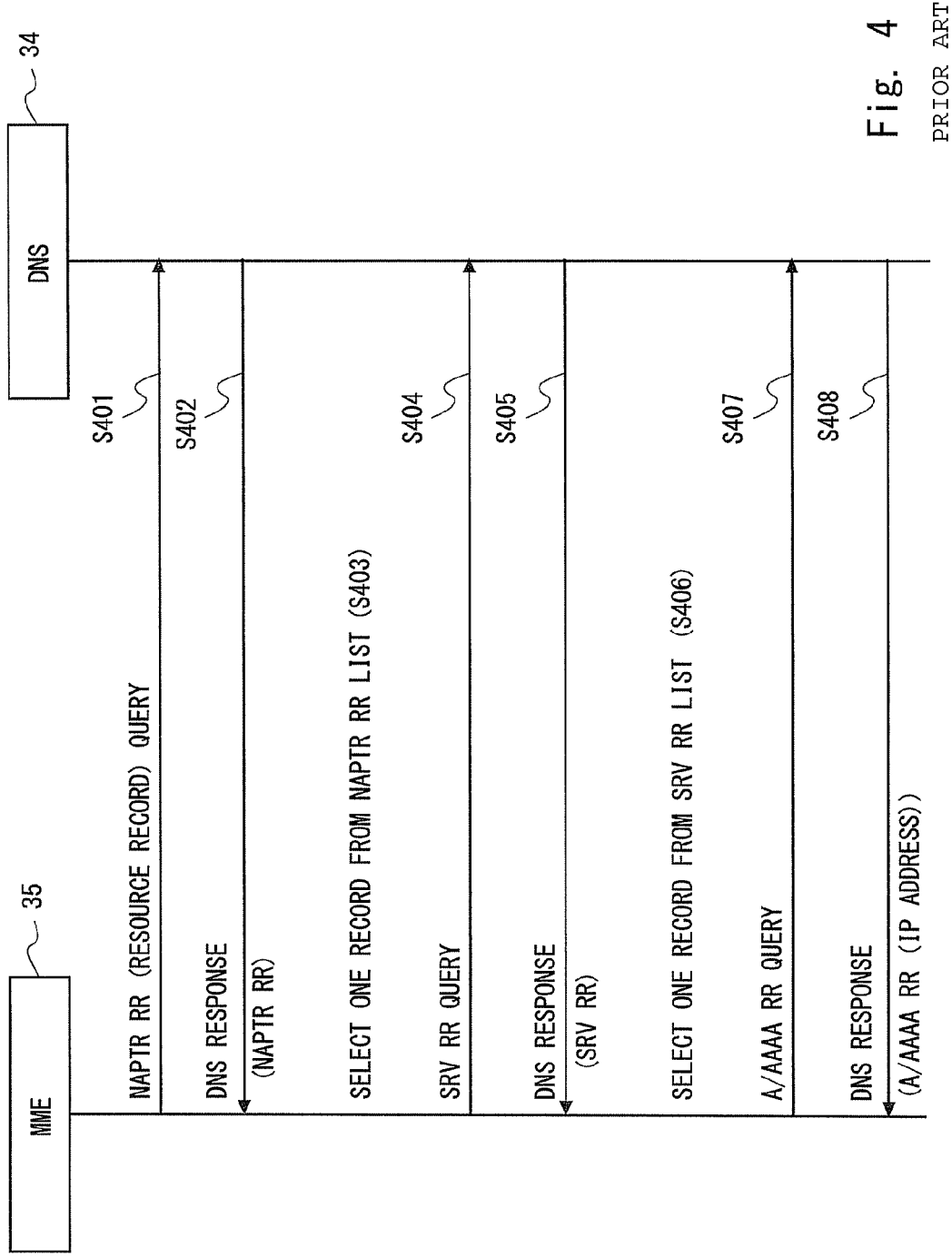
FIG. 4 is a sequence diagram showing a sequence of a control signal transmitted and received between the MME and a DNS server in the process flow of FIG. 3.

Next, an example of an operation of the mobile communication system shown in FIG. 1 is explained using a sequence diagram of FIG. 2. FIG. 2 is a sequence diagram for explaining an example of an operation of the mobile communication system of FIG. 1. FIG. 2 shows a sequence of a control signal transmitted and received between the EPC node 100 and the DNS server 101 when the EPC node such as the SGSN 102, the MME 103, the S-GW 104, and the P-GW 105, which form an EPC network, issues to the DNS server 101, an update request for a DNS resource record registered to the DNS server 101 that performs a selection operation on each of the EPC nodes 100. The EPC node 100 here may be any of the SGSN 102, the MME 103, the S-GW 104, and the P-GW 105 which form an EPC network, as mentioned above.

Firstly, each EPC node 100 such as the SGSN 102, the MME 103, the S-GW 104, and the P-GW 105, which form an EPC network, periodically monitors usage of a current resource (e.g., CPU and memory) of the own EPC node 100. The EPC node 100 evaluates whether or not the current resource usage exceeds an overloaded threshold that is previously determined in order to detect a state of the own EPC node 100 approaching to the overloaded state. When any of the EPC nodes 100 such as the SGSN 102, the MME 103, the S-GW 104, and the P-GW 105 detects that the current resource usage exceeds the above-mentioned overloaded threshold, the EPC node 100 evaluates that the own EPC node 100 is approaching to the overloaded state (Sequence S201).

The EPC node 100, which evaluated that the own EPC node 100 as approaching to the overloaded state, transmits to the DNS server 101, a PTR record query including an IP address of the own EPC node 100 in order to search for an EPC node name from an IP address of the own EPC node 100. The DNS server 101, which received the PTR record query, refers to a PTR record based on the IP address included in the PTR record query so as to extract the EPC node name of the EPC node 100 corresponding to the IP address and returns the extracted EPC node name to the querying EPC node 100 as a DNS response to the PTR record query (Sequence S202).

That is, the EPC node 100, which evaluated that the own EPC node 100 is approaching to the overloaded state, queries the DNS server 101 to thereby reverse lookup the EPC node name of the own EPC node from the IP address of the own EPC node 100.

The EPC node 100, which received the EPC node name of the own EPC node 100 as a DNS response from the DNS server 101, transmits to the DNS server 101, an NAPTR record query including the EPC node name of the own EPC node 100 obtained in Sequence S202 in order to obtain an NAPTR record corresponding to the EPC node name of the own EPC node 100 as preprocessing for obtaining an FQDN (Fully Qualified Domain Name i.e., an A/AAAA record) of the own EPC node 100.

The DNS server 101, which received the NAPTR record query, extracts the NAPTR records corresponding to the EPC node name including a supplementary NAPTR record based on the EPC node name included in the NAPTR record query and returns the extracted NAPTR records to the querying EPC node 100 as a DNS response to the NAPTR record query (Sequence S203). That is, the EPC node 100, which received the EPC node name of the own EPC node 100 from the DNS server 101, queries the DNS server 101 so as to reverse lookup the NAPTR record from the EPC node name of the own EPC node 100.

The EPC node 100, which received the NAPTR records corresponding to the EPC node name of the own EPC node 100 as a DNS response from the DNS server 101, searches in the Flag field of the received NAPTR record and extracts supplementary NAPTR records having setting of Flag="p".

Further, the EPC node 100 extracts a supplementary NAPTR record having setting of Services="NAPTR" in the Services field among the extracted supplementary NAPTR records and transmits, to the DNS server 101, an NAPTR record query including a value set to the Regexp field of the supplementary NAPTR record (Regexp="a domain name of the NAPTR record").

The DNS server 101, which received the NAPTR record query, extracts the NAPTR record corresponding to the domain name based on the domain name of the NAPTR record included in the NAPTR record query and returns the extracted NAPTR record to the querying EPC node 100 as a DNS response to the NAPTR record query (Sequence S204).

Furthermore, the EPC node 100 extracts a supplementary NAPTR record having setting of Services=SRV" in the Services field among the extracted supplementary NAPTR records and transmits, to the DNS server 101, an NAPTR record query including a value set to the Regexp field of the supplementary NAPTR record (Regexp="domain name of the SRV record").

The DNS server 101, which received the SRV record query, extracts the SRV record corresponding to the domain name based on the domain name of the SRV record included in the SRV record query and returns the extracted SRV record to the querying EPC node 100 as a DNS response to the SRV record query (Sequence S204). That is, the EPC node 100, which received the supplementary NAPTR record corresponding to the EPC node name of the own EPC node 100 from the DNS server 101, queries the DNS server 101 so as to forward lookup the NAPTR record and the SRV record relating to the own EPC node 100.

After that, the EPC node 100, which received the NAPTR record corresponding to the value of the Regexp field of the supplementary NAPTR record as a DNS response in Sequence S204, checks the Flag field of each of the received NAPTR records. When Flag="a" (i.e., a value set to the Replacement field is an FQDN (Fully Qualified Domain Name) of an A/AAAA RR), and further, the value set to the Replacement field matches the EPC node name of the own EPC node 100 obtained from the DNS server 101 in Sequence S202, the NAPTR record is an NAPTR record leading to selection of the own EPC node 100. Thus, the EPC node 100 holds the NAPTR record as an NAPTR record to be updated (Sequence S205).

Moreover, the EPC node 100, which received the SRV record corresponding to the value of the Regexp field of the supplementary NAPTR record as a DNS response in Sequence S204, checks the Target field of each of the received NAPTR records. When a value set to the Target field matches the EPC node name of the own EPC node 100 obtained from the DNS server 101 in Sequence S202, the SRV record is an SRV record leading to selection of the own EPC node 100. Thus, the EPC node 100 holds the SRV record as an SRV record to be updated (Sequence S205).

The EPC node 100, which holds the NAPTR record to be updated in Sequence S205, sets the Order field and the Preference field of the holding NAPTR record such that, for example, Order='65535' (all '1's in binary) and Preference="65535" (all '1's in binary) as the lowest selection priority in order for the DNS server 101 side to update the registration of the NAPTR record to set the selection priority for selecting the EPC node 100 to be lower than other same kind of EPC nodes and transmits, to the DNS server 101, an NAPTR record update request for changing the selection priority (Sequence S206).

In response to the update request, the DNS server 101, which received the NAPTR record update request, updates the registration of the Order field and the Preference field of the NAPTR record included in the NAPTR record update request such that Order='65535' (all '1's in binary) and Preference="65535" (all '1's in binary), which is the lowest selection priority. After the registration update is completed, the DNS server 101 returns, to the querying EPC node 100, information notifying of successful update of the NAPTR record as a DNS response to the NAPTR record update request (Sequence S207).

Moreover, the EPC node 100, which holds the SVR record to be updated in Sequence S205, sets the Priority field and the Weight field of the holding SRV record such that, for example, Priority='65535' (all '1's in binary) and Weight="0" (all '0's in binary) as the lowest selection priority in order for the DNS server 101 side to update the registration of the SRV record to set the selection priority for selecting the EPC node 100 to be lower than other same kind of EPC nodes and transmits, to the DNS server 101, the SRV record as an SRV record update request for changing the selection priority (Sequence S206).

In response to the update request, the DNS server 101, which received the SRV record update request, updates the registration of the Priority field and the Weight field of the SRV record included in the SRV record update request such that Priority='65535' (all '1's in binary) and Weight="0" (all '0's in binary), which is the lowest selection priority. After the registration update is completed, the DNS server 101 returns, to the querying EPC node 100, information notifying of successful update of the SRV record as a DNS response to the SRV record update request (Sequence S207).

Such a sequence updates the DNS resource record of the DNS server 101 that controls the selection operation of the EPC node 100 approaching to the overloaded state, i.e., the registration state of the selection priority of the NAPTR record and the SRV record, thereby automatically setting to a state that is difficult to select the EPC node 100 and encouraging to select other EPV node with available resource.

Meanwhile, the EPC node 100, which has been approaching to the overloaded state and had the selection priority changed, continues the operation to periodically monitor the current resource usage. That is, the EPC node 100 evaluates whether or not the current resource usage is in a state less than or equal to a normal state returned threshold that is previously determined to detect that the own EPC node 100 is in a state completely out of the overloaded state. The normal state returned threshold here is preferably set to a value less than or equal to the overload threshold for detecting that the current resource usage is approaching to the overloaded state in order to prevent the update operation of the selection priority from being frequently repeated.

When the EPC node 100, which has been approaching to the overloaded state and had the selection priority changed, detects that the current resource usage is reduced to be lower than or equal to the normal state returned threshold, the EPC node 100 evaluates that the own EPC node 100 is in the state completely out of the overloaded state, i.e., evaluates that an overloaded state end condition is satisfied (Sequence S208).

In order to return the selection priority of the EPC node 100 to an original state, the EPC node 100, which detected that the overloaded state end condition is satisfied, extracts the NAPTR record and the SRV record to be updated that are held in Sequence S205 and transmits, to the DNS server 101, the extracted NAPTR record and the extracted SRV record as an NAPTR record update request and an SRV record update request for returning the selection priority to the original state (Sequence S209).

In response to the update request, the DNS server 101, which received the NAPTR record update request and the SRV record update request, updates and registers the Order field and the Preference field of the NAPTR record included in the NAPTR record update request and the Priority field and the Weight field of the SRV record included in the SRV record update request. After the registration update is completed, the DNS server 101 returns, to the querying EPC node 100, information notifying of successful update of the NAPTR record and the SRV record as a DNS response to the update request for the NAPTR record and the SRV record (Sequence S210).

Such a sequence returns, to an original state, the registration state of the selection priority of the DNS resource record of the DNS server 101 that controls the selection operation of the EPC node 100, which is completely out of the overloaded state and have available resource, i.e., a registration state of the selection priority of the NAPTR record and the SRV record. This allows the EPC node 100 to be out of the state of not being selected even if the EPC node 100 has available resource and it is possible to automatically set to a state allowing for normal selection.

Explanation of Exemplary Advantage of Exemplary Embodiment

As has been explained in detail so far, in this exemplary embodiment, when each of the EPC nodes 100 detects that the own EPC node 100 is approaching to the overloaded state, the EPC node 100 autonomously changes the selection priority of the DNS resource record (an NAPTR record and an SRV record) that is related to the own EPC node 100 and registered to the DNS server 101. This therefore sets the EPC node, which is approaching to the overloaded state, to a difficult state for selection and allows other EPC nodes with available resource to be preferentially selected, thereby maintaining loads in a whole EPC network equal.

Further, after the selection priority is changed, the EPC node 100, which is completely out of the overloaded state and have available resource, autonomously returns the selection priority of the DNS resource record that is related to the own EPC node 100 and registered to the DNS server 100 to the original selection priority. This therefore returns the EPC node to a state that allows normal selection and equally maintains loads in a whole EPC network.

The preferred exemplary embodiment of the present invention has been explained so far. However, note that the exemplary embodiment is merely illustration of the present invention and does not limit the present invention in any way. Those skilled in the art would easily understand that various modifications and changes can be made according to particular usage without departing from the scope of the present invention.

Although the above embodiment explained the present invention as a hardware configuration, the present invention is not limited to this. The present invention can be achieved by causing a CPU (Central Processing Unit) to execute arbitrary processing on a computer program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been explained with reference to the exemplary embodiments, the present invention is not limited by above. Various modifications, obvious to those skilled in the art, can be made to the configurations and details of the present invention within the scope of the invention.

(Supplementary Note 1)

A mobile communication system distributes loads of each of EPC nodes by selecting an EPC node to use, by a DNS server, among the EPC nodes forming an EPC (Evolved Packet Core) network, which forms a core of an LTE (Long Term Evolution) network for mobile communication, based on a selection priority in a DNS resource record registered to the DNS server. Each of the EPC nodes includes a DDNS (Dynamic DNS) client function that transmits an update request for the DNS resource record to the DNS server in order to lower the selection priority of the DNS resource record relating to the EPC node when the EPC node detects that resource usage of the own EPC node exceeds an overloaded threshold previously specified to detect that the resource usage of the own EPC node is approaching to an overloaded state, and the DNS server includes a DDNS server function that dynamically updates, in response to the update request, the DNS resource record when the DNS server receives the update request for the DNS resource record from the EPC node.

(Supplementary Note 2)

A control method of a mobile communication system distributes loads of each of EPC nodes by selecting, using a DNS server, an EPC node to use, among the EPC nodes forming an EPC (Evolved Packet Core) network, which forms a core of an LTE (Long Term Evolution) network for mobile communication, based on a selection priority in a DNS resource record registered to the DNS server. Each of the EPC nodes includes a DDNS (Dynamic DNS) client function that transmits an update request for the DNS resource record to the DNS server in order to lower the selection priority of the DNS resource record relating to the EPC node when the EPC node detects that resource usage of the own EPC node exceeds an overloaded threshold previously specified to detect that the resource usage of the own EPC node is approaching to an overloaded state, and the DNS server includes a DDNS server function that dynamically updates, in response to the update request, the DNS resource record when the DNS server receives the update request for the DNS resource record from the EPC node.

REFERENCE SIGNS LIST

100 EPC NODE
101 DNS SERVER
102 SGSN
103 MME
104 S-GW
105 P-GW
31 S-GW1
32 S-GW2
33 S-GW3
34 DNS SERVER
35 MME

The invention claimed is:

1. A mobile communication system comprising:
   a plurality of EPC (Evolved Packet Core) nodes configured to form an EPC network, the EPC network forming a core of an LTE (Long Term Evolution) network for mobile communication; and
   a DNS (Domain Name Server) server configured to select from among the plurality of EPC nodes the EPC node to use based on a selection priority in a registered DNS resource record,
   wherein each of the plurality of EPC nodes includes a DDNS (Dynamic DNS) client function configured to transmit an update request for the DNS resource record to the DNS server to lower the selection priority of the DNS resource record relating to a respective EPC node when the respective EPC node detects that resource usage of the respective EPC node exceeds an overloaded threshold previously specified to detect that the resource usage of the respective EPC node is approaching an overloaded state,
   wherein the DNS server includes a DDNS server function configured to dynamically update, in response to the update request, the DNS resource record when the DNS server receives the update request for the DNS resource record from the respective EPC node,
   wherein the DNS server further includes as the DNS resource record, in addition to an NAPTR (Naming Authority Pointer) record and an SRV (Service) record to which the selection priority is registered, a supplementary NAPTR record to which a domain name of the DNS resource record relating to the respective EPC node allocated with an EPC node name is previously set, and when the DNS server receives an NAPTR record query including the EPC node name of the respective EPC node from the respective EPC node, the DNS server extracts at least the supplementary NAPTR relating to the EPC node name included in the NAPTR record query and returns the extracted supplementary NAPTR to the querying EPC node.

2. The mobile communication system according to claim 1, wherein
   the respective EPC node, which transmitted the update request for the DNS resource record to the DNS server, transmits to the DNS server, a request for returning the selection priority of the DNS resource record relating to the respective EPC node to an original state when the respective EPC node detects that the resource usage of the respective EPC node is reduced to less than or equal to a previously specified normal state returned threshold to detect that the resource usage of the respective EPC node is out of the overloaded state, and
   when the DNS server receives the request from the EPC node, the DNS server dynamically updates the DNS resource record and returns the selection priority of the DNS resource record relating to the respective EPC node to the original state.

3. The mobile communication system according to claim 1, wherein the DNS server includes a PTR (Pointer) record for obtaining an EPC node name of the respective EPC node from an IP address of the respective EPC node, and when the DNS server receives a PTR record query including the IP address of the respective EPC node from a querying EPC node, the DNS server returns, to the querying EPC node, the EPC node name of the respective EPC node extracted from the PTR record based on the IP address included in the PTR record query.

4. The mobile communication system according to claim 1, wherein the querying EPC node, which received the supplementary NAPTR record from the DNS server, transmits to the DNS server, an NAPTR record query and an SRV record query respectively including a domain name of the NAPTR record and the SRV record included in the supplementary NAPTR record, and when the NAPTR record and the SRV record relating to the respective EPC node are returned from the DNS server as responses to the NAPTR record query and the SRV record query, the querying EPC node appropriately rewrites a selection priority set to the returned NAPTR record and the returned SRV record and transmits the NAPTR record and the SRV record to the DNS server as an update request for the DNS resource record.

5. A control method of a mobile communication system comprising:
   selecting, by a DNS (Domain Name Server) server, from a plurality of EPC (Evolved Packet Core) nodes configured to form an EPC network, the EPC node to use based on a selection priority in a DNS resource record registered to the DNS server, the EPC network forming a core of an LTE (Long Term Evolution) network for mobile communication; and
   transmitting, by a DDNS (Dynamic DNS) client function in each of the plurality of EPC nodes, an update request for a DNS resource record to the DNS server, to lower the selection priority of the DNS resource record relating to a respective said EPC node, when the respective EPC node detects that resource usage of the respective EPC node exceeds a previously specified overloaded threshold to detect that the resource usage of the respective EPC node is approaching an overloaded state,
   wherein the DNS server includes a DDNS server function configured to dynamically update the DNS resource record and dynamically update, in response to the update request, the resource record when the DNS server receives the update request for the DNS resource record from the respective EPC node,
   wherein the DNS server further includes as the DNS resource record, in addition to an NAPTR (Naming Authority Pointer) record and an SRV (Service) record to which the selection priority is registered, a supplementary NAPTR record to which a domain name of the DNS resource record relating to the respective EPC node allocated with an EPC node name is previously set, and when the DNS server receives an NAPTR record query including the EPC node name of the respective EPC node from the respective EPC node, the DNS server extracts at least the supplementary NAPTR relating to the EPC node name included in the NAPTR record query and returns the extracted supplementary NAPTR to the querying EPC node.

6. The control method according to claim 5, wherein
   the respective EPC node, which transmitted the update request for the DNS resource record to the DNS server, transmits to the DNS server, a request for returning the selection priority of the DNS resource record relating to the respective EPC node to an original state when the respective EPC node detects that the resource usage of the respective EPC node is reduced to less than or equal to a previously specified normal state returned threshold to detect that resource usage of the respective EPC node is out of the overloaded state, and
   when the DNS server receives the request from the respective EPC node, the DNS server dynamically updates the DNS resource record and returns the selection priority of the DNS resource record relating to the respective EPC node to the original state.

7. A non-transitory computer readable medium storing a control program for a mobile communication system, the program executing in a processor, the control method of the mobile communication system according to claim 5.

8. The mobile communication system according to claim 2, wherein the DNS server includes a PTR (Pointer) record for obtaining an EPC node name of the EPC node from an IP address of the respective EPC node, and when the DNS server receives a PTR record query including the IP address of the respective EPC node from a querying EPC node, the DNS server returns, to the querying EPC node, the EPC node name of the EPC node extracted from the PTR record based on the IP address included in the PTR record query.

9. A non-transitory computer readable medium storing a control program for a mobile communication system, the program executing in a processor, the control method of the mobile communication system according to claim 6.

\* \* \* \* \*